No. 885,735. PATENTED APR. 28, 1908.
W. I. DENGLER.
GUARD FOR EYEGLASSES.
APPLICATION FILED FEB. 12, 1904.
FIG. I.
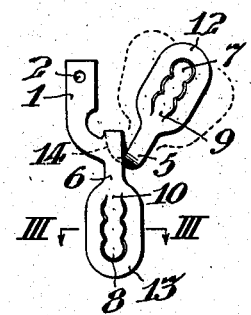
FIG. II.
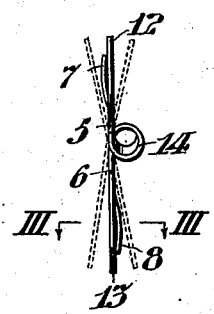
FIG. III.
FIG. IV.
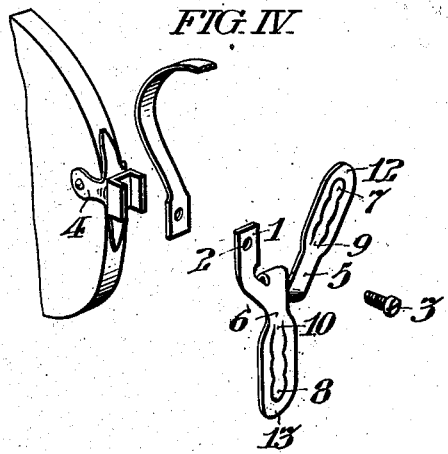
FIG. V.
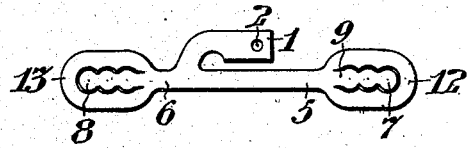
FIG. VI.
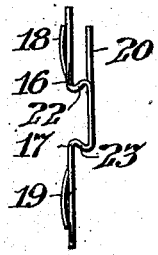
WITNESSES:
Clifton C. Hallowell
John C. Bergner
INVENTOR:
WILLIAM I. DENGLER,
by Paige, Paul & Foley
Attys.

UNITED STATES PATENT OFFICE.

WILLIAM I. DENGLER, OF ATLANTIC CITY, NEW JERSEY.

GUARD FOR EYEGLASSES.

No. 885,735.

Specification of Letters Patent.

Patented April 28, 1908.

Application filed February 12, 1904. Serial No. 193,222.

*To all whom it may concern:*

Be it known that I, WILLIAM I. DENGLER, of Atlantic City, in the county of Atlantic and State of New Jersey, have invented certain new and useful Improvements in Guards for Eyeglasses, whereof the following is a specification, reference being had to the accompanying drawings.

It is the object of this invention to provide a nose guard which is adapted for adjustment both in a direction parallel with the plane of the lenses and in other directions oblique thereto.

As hereinafter described my invention comprises a nose guard having an arm for attachment to the lens clamp and two nose bearing arms extending from said attaching arm, one of said bearing arms being connected with said attaching arm by an involute curved portion, whereby it is adapted to be angularly adjusted as hereinafter described.

Another feature of my invention, as hereinafter described, is the provision in each of the nose bearing arms of the guard, of an adjustable spring tongue having its free end surrounded by a frame comprising the margin of the arm; said tongue being adjustable relatively to the plane of its frame, so that each nose bearing arm affords three points of contact with the nose, in variable relation with each other, and thus readily adaptable to the contour of any nose.

My invention comprehends the various novel features of construction and arrangement hereinafter more definitely specified.

In the accompanying drawings, Figure I, is an inner face view of a nose guard conveniently embodying my improvements. Fig. II, is a view of the inner edge of the guard shown in Fig. I. Fig. III, is a sectional view taken on the line III, III, in Figs. I, and II. Fig. IV, is a perspective view showing, in separate relation, a fragment of a lens provided with a clamp; a bridge spring adapted to fit said clamp; a nose guard adapted to fit said clamp, and a screw adapted to secure said parts in stationary relation. Fig. V, is a plan view of the sheet metal blank from which the guard shown in Figs. I, II and III, is formed. Fig. VI, is an edge view of a clamp showing a modified form of my invention.

In the form of my invention shown in Figs. I to V, inclusive; the nose guard comprises the attaching arm 1, conveniently provided with the aperture 2, near its upper extremity to receive the screw 3, for connection with the lens clamp 4. Said arm 1, merges into respectively upper and lower nose bearing arms 5, and 6, whose free ends comprise respective spring tongues 7, and 8, joined to said arms 5, and 6, at their inner ends 9, and 10, and having their free ends surrounded by the marginal frames 12, and 13.

As shown in Figs. I, and II, the nose bearing arm 6, extends substantially in the plane of the attaching arm 1, but the nose bearing arm 5, is connected with said arm 1, by an involute or helical curved spring portion 14, so that it may be adjustably bent in any direction. Said arms 5, and 6, may be shifted in angular relation to said attaching arm 1, in a direction parallel with the plane of the lenses, as indicated in dotted lines in Fig. II, and may also be shifted in a plane oblique to the plane of the lenses as indicated by the dotted lines in Fig. I. Moreover, it is to be understood that the spring tongues 7, and 8, may be bent with respect to their frames 12, and 13, either inwardly, as indicated at the upper portion of Fig. II, or outwardly as indicated at the lower portion of Fig. II, so as to afford three points of contacts upon the nose of the wearer, in a concave or convex curve as indicated respectively by the full lines and by the dotted lines in Fig. III.

Although I prefer to connect the nose bearing arms by an adjustable helically curved portion, as above described, it is to be understood that nose bearing arms comprising spring tongues and marginal frames for the free ends of the tongues, constructed in accordance with my invention, may be otherwise connected. For instance, in Fig. VI, the arms 16, and 17, comprising the respective spring tongues 18, and 19, are connected with the attaching arm 20, by curved portions 22, and 23, which permit such adjustment in their angular relation as to fit any nose.

My improvements above described are advantageous in that they provide a nose guard which is not only readily adjustable, by bending in any direction, to meet all of the requirements of a wearer of eyeglasses, but which when adjusted affords an unusually secure support by reason of the three point contact of each arm bearing upon the nose.

I do not desire to limit myself to the precise details of construction herein set forth, as it is obvious that various modifications may be made therein without departing from the essential features of my invention.

I claim:—

1. In eyeglasses, the combination with lenses; of lens clips; a bridge spring; and, nose guards connected with said lenses and clips, and having spirally bent oppositely extending arms, free at their extremities, and arranged to independently press upon the nose, substantially as set forth.

2. In an eyeglass guard, an attaching arm arranged to be fastened to a lens clip and laterally bent at its base and there connected with integral oppositely extending arms which are spirally bent near said base and free at their opposite extremities to independently press against the nose, substantially as set forth.

3. In eyeglasses, the combination with lenses; of lens clips; a bridge spring seated on said clips at opposite ends; and, nose guards each comprising an arm seated on the bridge spring, having a curved base and oppositely extending arms, bent into spiral form at said base and provided at their free ends with independent plates arranged to engage the nose, substantially as set forth.

In testimony whereof, I have hereunto signed my name, at Atlantic City in the State of New Jersey this 10th day of February 1904.

WILLIAM I. DENGLER.

Witnesses:
   E. H. BROOKE,
   J. WM. HUGHES.